(12) United States Patent
Lindblad

(10) Patent No.: US 11,454,271 B2
(45) Date of Patent: Sep. 27, 2022

(54) MAGNETIC AND MECHANICAL CONNECTING DEVICE

(71) Applicant: Elite Group International AB, Jönköping (SE)

(72) Inventor: Nicklas Lindblad, Jönköping (SE)

(73) Assignee: ELITE GROUP INTERNATIONAL AB, Jönköping (SE)

( * ) Notice: Subject to any disclaimer, the term of this patent is extended or adjusted under 35 U.S.C. 154(b) by 303 days.

(21) Appl. No.: 16/645,923

(22) PCT Filed: Sep. 11, 2017

(86) PCT No.: PCT/SE2017/050892
§ 371 (c)(1),
(2) Date: Mar. 10, 2020

(87) PCT Pub. No.: WO2019/050444
PCT Pub. Date: Mar. 14, 2019

(65) Prior Publication Data
US 2020/0277977 A1    Sep. 3, 2020

(51) Int. Cl.
   *F16B 21/12*     (2006.01)
   *B62B 7/00*      (2006.01)
   *F16B 1/00*      (2006.01)

(52) U.S. Cl.
   CPC .......... *F16B 21/125* (2013.01); *B62B 7/008* (2013.01); *F16B 1/00* (2013.01); *B62B 2207/02* (2013.01); *F16B 2001/0035* (2013.01)

(58) Field of Classification Search
   USPC ........... 248/220.21, 220.22, 221.11, 222.11, 248/222.12, 223.41, 224.8
   See application file for complete search history.

(56) References Cited

U.S. PATENT DOCUMENTS

| 4,775,269 A | 10/1988 | Brix |
| 2010/0044984 A1 | 2/2010 | Cohen et al. |

(Continued)

FOREIGN PATENT DOCUMENTS

| AU | 2013100643 A4 | 6/2013 |
| CN | 103375461 A | 10/2013 |
| CN | 204419800 U | 6/2015 |

OTHER PUBLICATIONS

European Search Report, dated Feb. 25, 2021, issued in European Patent Application No. 17924165.8, consisting of 6 pages.

(Continued)

*Primary Examiner* — Alfred J Wujciak
(74) *Attorney, Agent, or Firm* — Christopher & Weisberg, P.A.

(57) ABSTRACT

A magnetic and mechanical connection device includes a connection surface provided female part with a female housing having a bottom to which bottom on the inside a first permanent magnet is attached and a top provided with a female opening. A connection surface provided male part with a male housing provided with a connection member having at least a magnetic surface and being slightly smaller than the female opening in the female part, the male part connecting magnetically with the permanent magnet. A spring biased locking pin is attached to either the connection member of the male part or the female opening of the female part. The locking pin is directed in a perpendicular direction from the insertion direction and which locking pin is interacting in a locking engagement with an opposite locking groove in the opposite part.

20 Claims, 4 Drawing Sheets

(56) References Cited

U.S. PATENT DOCUMENTS

2015/0374076 A1\* 12/2015 Theobald ............. A44B 19/303
                                                              24/419
2016/0003274 A1   1/2016 Garlick
2021/0180642 A1\* 6/2021 Botkus ...................... F16B 1/00

OTHER PUBLICATIONS

International Search Report and Written Opinion dated May 21, 2018 issued in PCT Application No. PCT/SE2017/050892, consisting of 10 pages.

\* cited by examiner

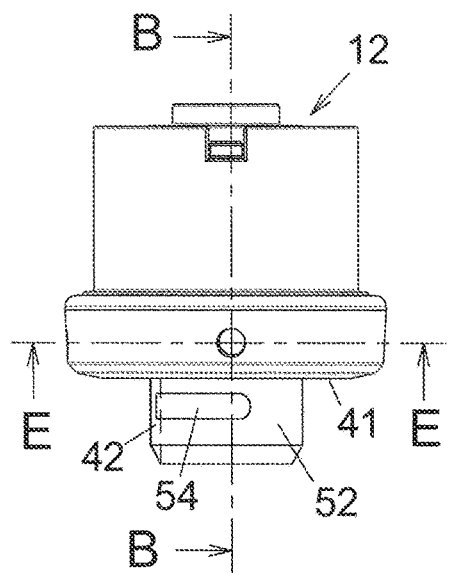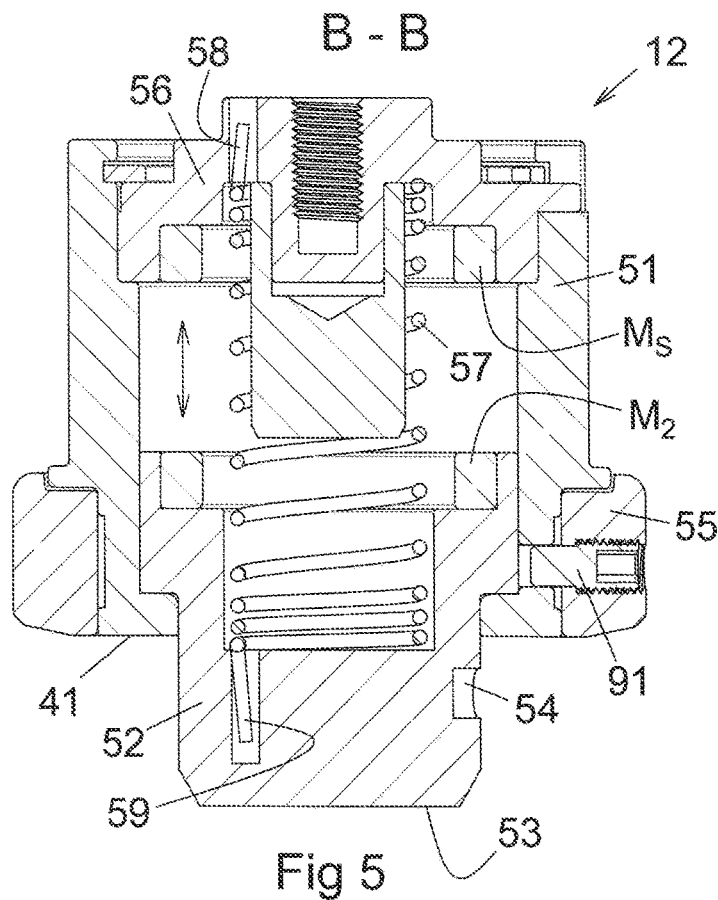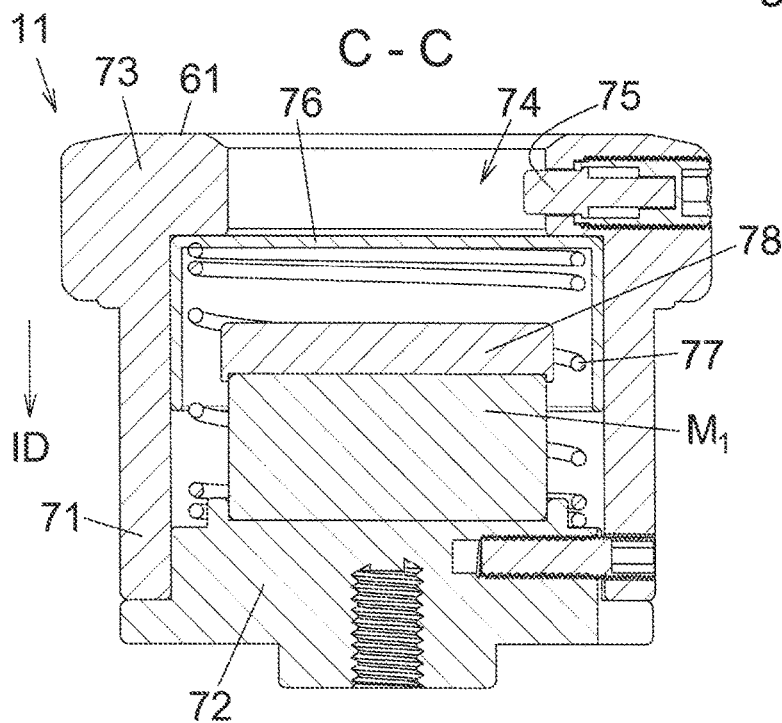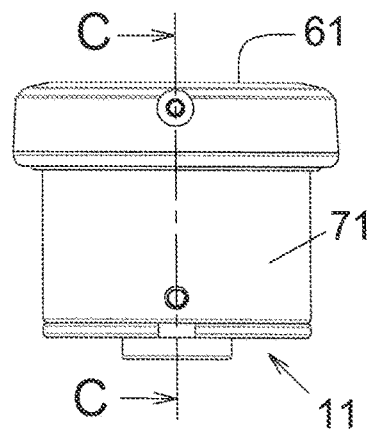

D - D

E - E

MAGNETIC AND MECHANICAL CONNECTING DEVICE

CROSS-REFERENCE TO RELATED APPLICATIONS

This application is a Submission Under 35 U.S.C. § 371 for U.S. National Stage Patent Application of International Application Number: PCT/SE2017/050892, filed Sep. 11, 2017 entitled "MAGNETIC AND MECHANICAL CONNECTING DEVICE," the entirety of which is incorporated herein by reference.

TECHNICAL FIELD

The invention refer to a manually operable coupling devices and more specifically the issue of attaching to items automatically together and detaching the items by a manual movement. For example using the coupling device for baby stroller connection. The coupling uses magnetic force and provides an automatic locking.

BACKGROUND OF THE INVENTION

Baby stroller connection often uses a common mechanical structures for a connection link between the strollers. The use of multi-handling steps required to complete the manual connection and disconnection of baby strollers looks bulky and are very cumbersome to operate.

A simple magnetic connection, although easy to use, provides a large number of magnetic leakage and therefore there will be a lot of security risks, for example it may attract iron objects which can be harmful to children. It may also cause problems in traffic environment and it may even attached to a car. And it will also bring some inconvenience, such as it cannot be brought to an airplane because there is a large magnetic field surrounding the baby stroller. In addition, simple magnetic connection easily separates the strollers under influence of large external forces, which will not be safe enough.

The patent application US 2010/0044984 relates to the background of an application of a connecting mechanism for joining single strollers to each other.

THE OBJECT OF THE INVENTION

The object of the invention is to solve said problems by providing a coupling device that provides a connection by a magnetic force in combination with an automatic mechanically safety locking function.

An object is also to provide a coupling device which is quick to release from its locking position.

It is also an object of the invention to solve the problem of magnetism leakage in the magnetic device.

The object is furthermore to provide an automatic locking and single unlock device when the magnetic device is connected.

An object is to provide such a connection device suitable for a variety of applications.

An object is also to provide a coupling device with a telescopic structure for switching the device from an active state to a passive state.

SUMMARY OF THE INVENTION

The present invention is a result of a great deal of work for the leakage of the magnetic force which as a result of the invention has been reduced to acceptable levels. For example, a connection device under the invention can be taken on to an airplane as a non-magnetic product and without any other measures. The adsorption capacity of the magnetic force did not decline, when using a single connection device containing two devices, for example in a baby stroller. A separation test of the condition of unlocking, the connecting device according to the invention can withstand more than 120N linear tensile strength. In addition to purely magnetic attraction, the connecting device also added an automatic mechanical locking feature to ensure maximum safety. In tests with a single connecting device to items could not be separated when the connecting device was locked automatically. The way to disconnect the items is by using a single unlocking operation. The connecting device provides a telescopic device on the male part, which can be extended into an active state when needed, and after completion, it can be retracted into a passive state when giving a connection member a push.

Even if the exemplification of an application of the device is directed towards a baby stroller, the connecting device can be advantageous in many other applications, such as connecting shopping carts in supermarkets, connecting luggage items for walking between gates in airport, attaching shopping bags to storage areas in cars and lots of other areas of connections between items where the items is to be easy attached and safety secured and which also provides an easy manual disconnection of the items from a connected state.

Further applications for the invention are couplings between bicycle-bicycle basket; bicycle-bicycle seat; bicycle-bicycle support wheels; bags to be attached inside a car or to be attached to a wheelchair or to be attached to a further bag such as for instance suitcase-hand luggage. Also couplings for other applications such as attachments for strollers, wheelchairs, bags are possible areas of use for the invention. Even for connecting other items, such as cup holders, parasol holders, standing boards, to wheel attached items are possible with the present invention.

By the present invention, as the same appears in the independent claims, the above-mentioned objects are met, said disadvantages having been eliminated. Suitable embodiments of the invention are defined in the dependent claims.

The invention concerns a magnetic and mechanical connection device which comprises a male part and a female part. The male part can be set in either of an active state or a passive state.

In an embodiment when the male part is set in a passive state or the connection is disengaged, the female part is automatically set in a magnetic reduction state.

The connection device is provided with a connection surface provided female part with a female housing having a bottom and a top and to which bottom on the inside a permanent magnet is attached and which top is provided with a female opening. The connection device is further provided with a connection surface provided male part housing with a connection member having at least a magnetic surface and being slightly smaller than the female opening in the female part in order for the male part to be able to enter the female opening in an insertion direction and to connect magnetically with the permanent magnet. Either the connection member of the male part or the female opening of the female part is provided with a spring biased locking pin directed in a perpendicular direction from the insertion direction and which locking pin is interacting in an axially locking engagement with an opposite locking groove in the opposite part which locking groove is wide enough to receive the spring biased locking pin. Preferably the direction of the spring biased locking pin is radial in relation to the female opening or to the male part. The locking groove is directed circumferential and essentially perpendicular to the insertion direction. The female part or the male part can be provided with two opposite each other spring biased locking pins interacting with separate locking grooves for a more secure attachment. The connection device is further provided with a release member operable to press the locking pin out from the locking groove in order to make it possible to separate said connection surfaces from each other.

In an embodiment of the invention the locking groove is located on the connection member and the locking pin is located in the female opening so that the locking pin engages the locking groove when the connection member enters the female opening.

In an embodiment of the invention the locking groove is located on the periphery of the connection member only along a part thereof.

In an embodiment of the invention the female part or the male part is provided with two opposite each other spring biased locking pins interacting with two separate locking grooves.

In an embodiment of the invention the connection member of the male part is provided with a releasing groove on its surface which groove is oriented parallel to the insertion direction of the connection member which releasing groove is wide enough to receive the spring biased locking pin of the female part when the connection member with its release groove is rotated to a position directly opposite the spring biased locking pin.

In an embodiment of the invention the connection member of the male part is spring biased and movable relative to a male part housing in directions parallel to its insertion direction between an extended position and a compressed position in which the male part connection surface and the magnetic surface of the connection member aligned.

In an embodiment of the invention the male part is provided with a release member which is located on the outside of the male part housing for operating the connection member for releasing the connection member from its compressed position.

In an embodiment of the invention the operating release member is connected to the connection member of the male part for rotating the connection member when the release m is rotated relative to the male part housing In an embodiment of the invention the connection member of the male part in a first position protrudes from the connection surface of the male part in an active state and that the connection member is compressed towards the spring force acting upon the connection member and locked in a second position and that the magnetic surface and the connection surface is in that locked position leveled with each other in a passive state of the device.

In an embodiment of the invention the male part housing is provided with a second permanent magnet cooperating with a magnetic surface or with a third permanent magnet either of which is attached to the connection member. The other surface is attached to a female housing top and that a state spring is attached between the second permanent magnet and the magnetic surface or the third permanent magnet and in that the state spring force is lower than the magnetic force holding the connection member in its passive compressed state and that the state spring force is increased to a level exceeding the magnetic holding level at twisting the state spring by rotating the release member.

In an embodiment of the invention a spring biased closure member is located in the female part housing and movable axially parallel with the insertion direction and which closure member closes the female opening in a passive state of the device. This closure covers the female opening and reduces the magnetic flux so that, for example, strollers can be carried into an airplane without being considered as a dangerous item. Preferably the closure member is formed like a cap with a closed top and with cylindrical sides open with an open bottom.

In an embodiment of the invention the release member both operates the connection member from the passive state to the active state and also sets the device in a state for releasing the attached male part from the female part by a rotational movement of the release member.

In an embodiment of the invention the rotational movement takes place under an angle that is approximately 45°-140°, preferably 60°-90° and most preferably 75°.

In an embodiment of the invention the female opening and the connection member of the device are cylindrical and the spring biased locking pin is directed in a radial direction.

In an embodiment of the invention the female part of the device is attached to a first object and the male part of the device is attached to a second object for easy engagement and disengagement of the objects to and from each other.

In an embodiment of the invention the device is attached as a magnetic coupling with a mechanical safety device for connecting two or more baby strollers to each other.

BRIEF DESCRIPTION OF THE DRAWINGS

Now, the invention will be described in more detail, reference being made in connection with the accompanying drawing figures.

FIG. 4 shows a side view of a male part of the connection device.

FIG. 5 shows a section view B-B as indicated in FIG. 4.

FIG. 6 shows a side view of a female part of the connection device.

FIG. 7 shows a section view C-C as indicated in FIG. 6.

DESCRIPTION OF THE INVENTION

Figure 1:
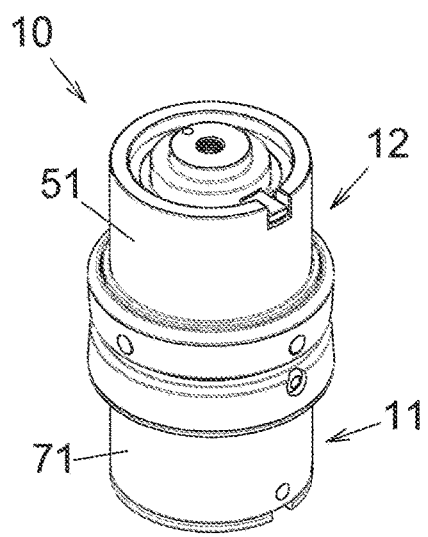
FIG. 1 shows schematically a connected connection device in perspective view according to an embodiment of the invention
Figure 2:
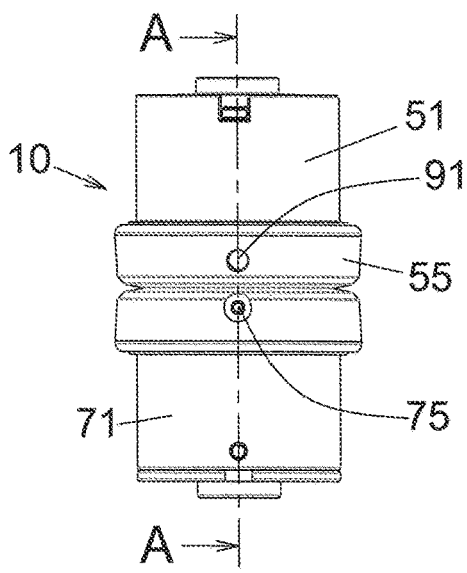
FIG. 2 shows the connection device in FIG. 1 in side view.
Figure 3:
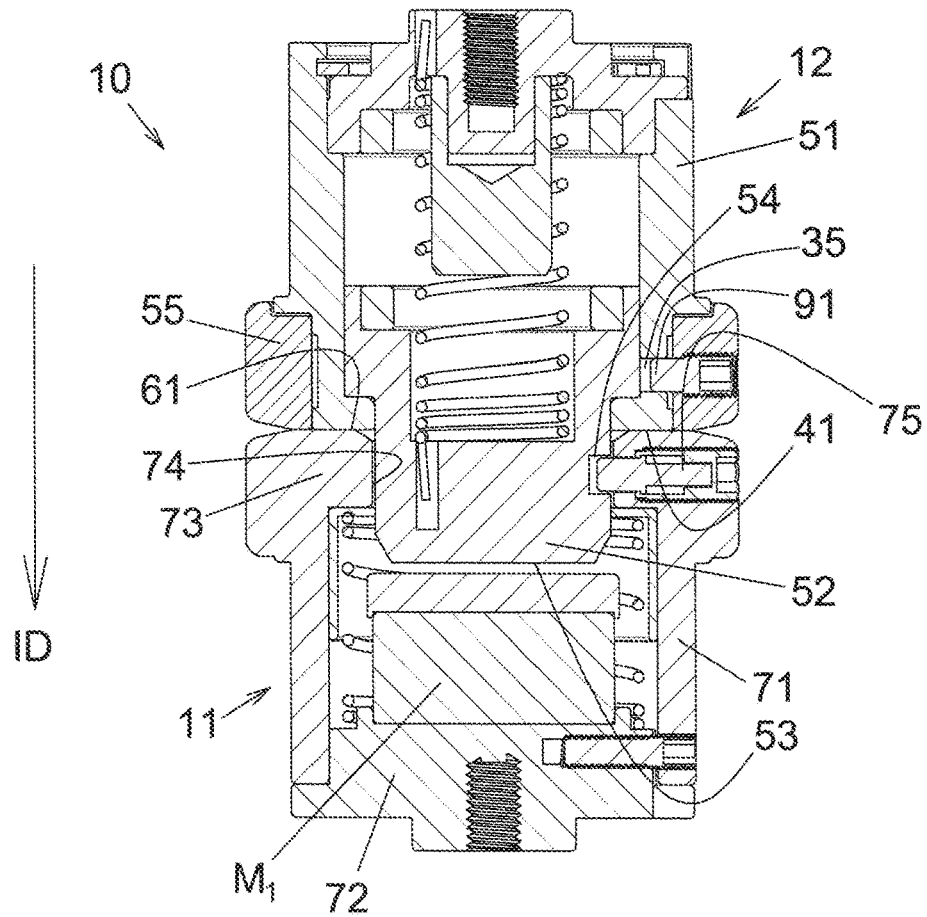
FIG. 3 shows a section view A-A as indicated in FIG. 2.

FIGS. 1-3 discloses an active connection device as a whole device assembly diagram.

FIGS. 4-5 discloses a male part of the connection device.

FIGS. 6-7 discloses a female part of the connection device which part can control the magnetic leakage from the device.

FIG. 8-11 discloses a release member of the connection device in the form of an operating collar on the male part for setting the device into an active state and for setting the device into a state for unlocking the device assembly.

FIGS. 12-15 discloses a connection member of the male part.

FIG. 1 shows a magnetic and mechanical connection device 10 consisting of a female part 11 having a female housing 71 and a male part 12 having a male housing 51 which parts are connected to each other in an assembled state.

FIG. 2 shows a side view of the assembled connection device 10 with the male housing 51 and the female housing 71 in a mechanical locked position in which a limiting pin 91 in a release member 55 is in line with a spring biased locking pin 75 in the female housing 71.

FIG. 3 shows a section A-A of the assembled connection device 10 taken as indicated in FIG. 2. The female part 11 of the connection device 10 is provided with the female housing 71 having a bottom 72 and a top 73. A connection surface 61 is provided on the outside of the top 73 of the housing 71. To the bottom 72 and on the inside of the housing 71 a first permanent magnet $M_1$ is attached. The top 73 of the housing 71 is provided with a cylindrical female opening 74.

The male part 12 having a male housing 51 is provided with a connection surface 41 through which a connection member 52 protrudes and at connection between the parts 11, 12 protrudes into the female opening 74. The connection member 52 having at least a magnetic surface 53. The connection member 52 is cylindrical and its diameter being slightly smaller than the cylindrical female opening 74 diameter in the female part 11 in order for the male part 12 to be able to enter the female opening 74 in an insertion direction ID and to be attracted magnetically or connect with the permanent magnet $M_1$.

A spring biased locking pin 75 is attached radially in the female opening 74 of the female part 11. Thus the locking pin 75 is directed in a perpendicular direction from the insertion direction ID. The locking pin 75 is interacting in a locking engagement with an opposite locking groove 54 in the connection member 52. The locking groove 54 is directed essentially perpendicular to the insertion direction ID and being wide enough to receive the spring biased locking pin 75.

Furthermore, a release member 55 is mounted around the male housing 51 operable to press the locking pin 75 out from the locking groove 54 by a twisting movement in order to make it possible to separate said connection surfaces 41, 61 from each other.

The twisting motion of the release member 55 forces an entraining pin, not disclosed in this figure, to rotate the connecting member 52 and thereby slide the locking pin 75 out from the locking groove 54 and on to the surface of the connection member 52 and is in such a position out of mechanical locking engagement with the locking groove wherein the male part and the female part can be separated. A limiting pin 91 is arranged to stop the angular rotation of the release member 55 in the male housing 51 by sliding in a limiting groove 35 in the male housing.

The function of the release member 55 will be further explained later.

FIG. 4 shows the male part 12 of the connection device. As previously indicated in FIG. 3 the male part 12 is provided with a connection surface 41 through which a connection member 52 protrudes. FIG. 4 also discloses the locking groove 54 on the surface of the connection member 52. The male part 12 is provided with a releasing groove 42 which is indicated by dashed line since the groove is hidden behind the viewable side in the figure. The releasing groove 42 is oriented parallel to the insertion direction of the connection member 52 and located on its surface. The purpose of the releasing groove is to provide for telescopic movement of the connection member by letting an entraining pin 21, FIGS. 9-11, to slide in the groove 42 and to provide for a disconnection of the connection parts by letting the locking pin 75, FIG. 3, to slide in the groove.

FIG. 5 shows a section B-B of the male part 12 in FIG. 4 as indicated. The same parts as described under FIG. 3 appear also in FIG. 5, i.e. the male housing 51, the connection surface 41, the connection member 52, the magnetic surface 53, the locking groove 54, the release member 55, the limiting pin 91. The magnetic surface 53 might in other embodiments be provided as a permanent magnet. In the male housing 51 a second permanent ring magnet $M_2$ is mounted either in connection with a male housing top 56 or as disclosed in the figure mounted in connection with the connection member. The second permanent magnet $M_2$ has a ring shape through which magnet a state spring 57 is attached in order to press with its compression spring force the second permanent magnet $M_2$ apart from a further ring shaped magnetic surface Ms mounted in either the connection member or as in the figure in the male housing top 56. This further ring shaped magnetic surface can be designed as a third permanent magnet. In other embodiments the location of the ring shaped items $M_2$, Ms can be vice versa compared to the embodiment disclosed in FIG. 5. The state spring 57 is provided with a first end 58 and a second end 59 which ends are rotationally fixed and attached between anchoring channels in the male housing top 56 and in the connection member 52. The state spring compression force is lower than the magnetic force of the second permanent magnet $M_2$ holding the connection member 52 in its passive compressed state. That the state spring 57 compression force is increased to a level exceeding the magnetic holding level of the second permanent magnet $M_2$ at twisting the state spring 57 by rotating the release member 55 in relation to the male housing 51. The state spring 57 is a combined torsional/pressure spring having its spring characteristics chosen to fit the magnetic force between the ring magnet and its interacting magnetic surface.

The male part 12 itself of the device can thus be set in:
a passive state when the connection member 52 is compressed and the magnetic force of the second permanent magnet $M_2$ holds the magnetic surface 53 of the connection member 52 leveled with the connection surface 41, and
an active state when the connection member 52 is released and the magnetic force of the second permanent magnet $M_2$ no longer holds the magnetic surface 53 of the connection member 52 leveled with the connection surface 41 and that the connection member protrudes from the connection surface ready to connect with the female part.

FIG. 6 shows the female part 11 with its female housing 71 and its connection surface 61.

FIG. 7 shows a section view C-C of the female part 11 as indicated in FIG. 6. The female part 11 is provided with a connection surface 61 at the top 73 of the female housing 71. The female part having a bottom 72 which part on the inside is provided with a first permanent magnet $M_1$ which on the top is provided with a steel spacer 78. Depending on the desirable magnetic force between the magnetic surfaces the steel spacer 78 might instead be placed under the first permanent magnet $M_1$. The top 73 is provided with a female opening 74 which has a diameter slightly larger than the diameter of the connection member of the male part. In the top 73 a spring biased locking pin 75 is mounted radially and directed perpendicular towards the centre of the female opening 74. The locking pin 75 is interacting in a locking engagement with an opposite locking groove in the opposite part which locking groove is directed circumferential and essentially perpendicular to the insertion direction and being wide enough to receive the spring biased locking pin 75. In the disclosed figure the locking pin 75 is attached to the female part 11 and the locking groove 54 is located on the connection member 52 of the male part 12, see FIG. 5. However, the opposite can occur in other embodiments, i.e. that the locking pin is attached to the connection member of the male part and the locking groove is located on the female part.

The female part is further provided with a security spring 77 biased against the closure member 76 and located in the female part housing 71. The closure member 76 is axially movable parallel with the insertion direction ID and which closure member 76 closes the female opening 74 both in a passive state of the device when the connection member of the male part is compressed and in an active state when the connection member has not yet entered the female opening 74. The purpose of the closure member is to reduce the magnetic flux outside the female part housing 71 and especially out through the female opening 74.

Figure 8:
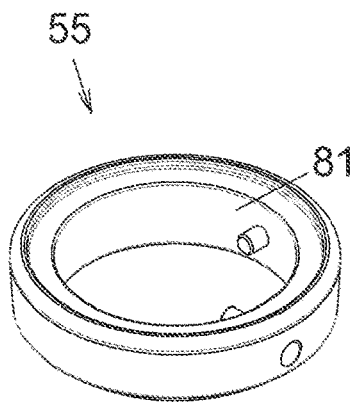
FIG. 8 shows a perspective view of an embodiment of a release member according to the invention.

FIG. 8 shows the release member 55 according to the invention. The release member is formed as a circular ring which has an inner sliding surface 81 for the release member 55 to rotate in relation to the male housing 51, see FIG. 5, when setting the device into an active state.

Figure 9:
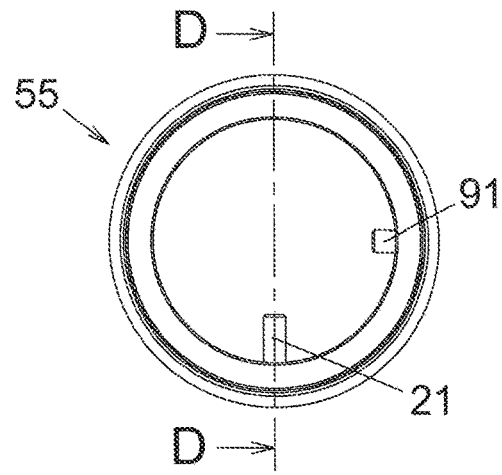
FIG. 9 shows a top view of the release member in FIG. 8.

FIG. 9 shows in top view the release member 55 with a first radially inward protruding pin which is a longer entraining pin 21 fixed mounted in the release member in order to reach the connecting member through an entraining slit in the male part housing. A second radially inward protruding limiting pin 91 which is shorter than the entraining pin 21 and which limiting pin 91 is also fixed mounted in the release member with the purpose to only provide a stop at the end of the entraining slit in the male part housing for the rotation movement of the release member 55 and thus the rotation of the connection member.

Figure 10:
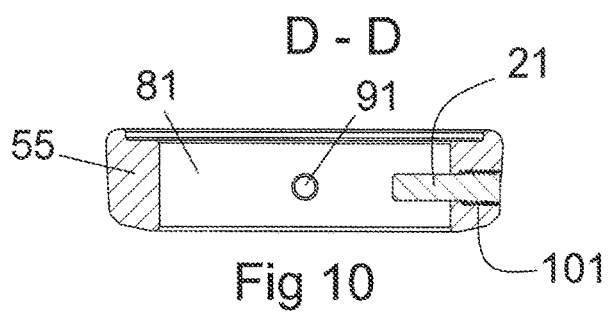
FIG. 10 shows an enlarged section view D-D taken as indicated in FIG. 9.

FIG. 10 shows an enlarged section view D-D taken as indicated in FIG. 9. The limiting pin 91 and the entraining pin 21 are both directed radially out from the sliding surface 81 towards the centre of the ring formed release member 55. The entraining pin 21 is screwed into its position by the threads 101 in order to be adjustable towards the interaction with the connecting member.

Figure 11:
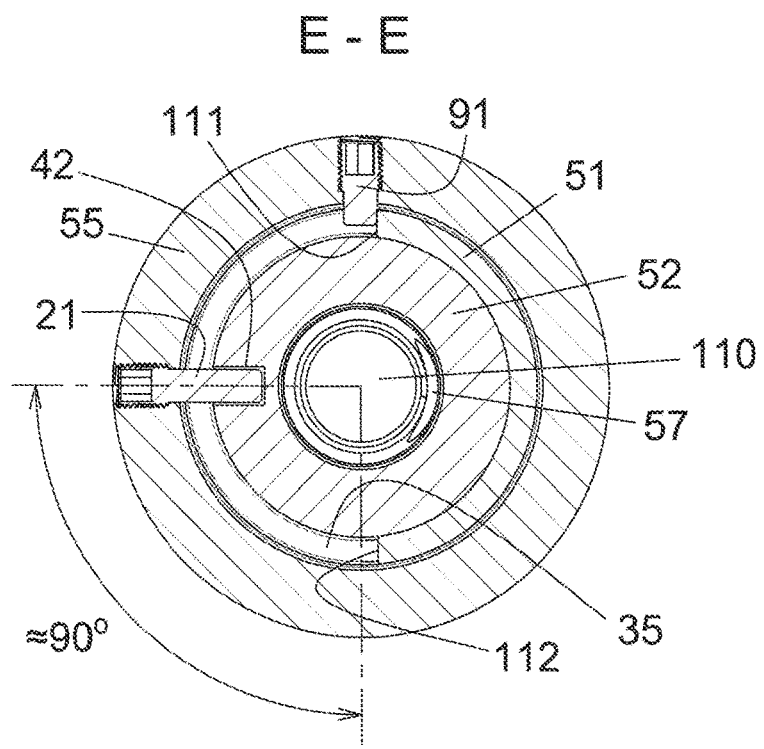
FIG. 11 shows a section view E-E as indicated in FIG. 4.

FIG. 11 shows a section view E-E as indicated in FIG. 4 with the release member 55 which can be rotated in relation to the male housing 51. In such a rotation the entraining pin 21 and the limiting pin 91, both fixed in the release member 55, will be rotated in the limiting groove 35 in the male housing 51 and making the connection member 52 to be rotated by the entraining pin 21 in the releasing groove 42 bringing a twist to the state spring 57, as can be seen in FIG. 5, which twist increases the spring coefficient of the spring. The state spring 57 is located in a spring compartment 110 in the connection member 57. The rotation will also making the limiting pin 91 to stop the rotation in one direction by abutting a first stop surface 111 in the male housing 51 as in the position disclosed in FIG. 11. A rotation of the release member in the opposite direction will bring the entraining pin 21 to about a second stop surface 112 in the male housing 51. As can be seen in the figure the rotation angle is approximately 90° in this embodiment. For other embodiments this angle might vary from 45°-140°.

Figure 12:
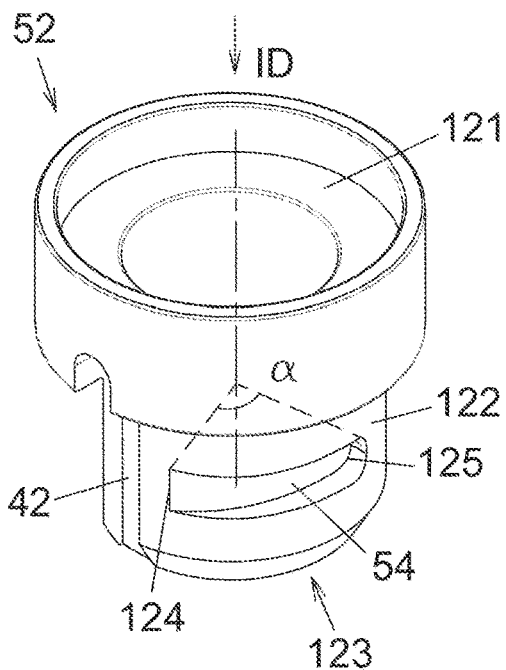
FIG. 12 shows a perspective view of an embodiment of a connection member according to the invention.

FIG. 12 shows the connection member 52 according to the invention. The connection member 52 is provided with a magnet seat 121 for the second permanent magnet. Further, in the cylindrical surface 122 of a protruding part 123 in the connection member 52 the locking groove 54 is directed perpendicular to the insertion direction ID of the connection member. The locking groove 54 has an extent of elongation of $45°<=\alpha<=130°$, preferably $\alpha=85$-$90°$. In embodiments with two opposite each other located spring biased locking pins 75 interacting with two separate locking grooves 54 the extent of elongation of the locking grooves is $30°<=\alpha<=100°$, preferably $\alpha=45$-$60°$. The locking groove 54 is wedge formed with a first end 124 entering the cylindrical surface 122 of the connection member 55 and with a second end 125 ending below the cylindrical surface 122 of the connection member 55. In the cylindrical surface 122 of the connection member 55 the releasing groove 42 is located and oriented parallel to the insertion direction ID of the connection member 52 and located on its surface in the vicinity of the first end 124 of the locking groove 54.

Figure 13:
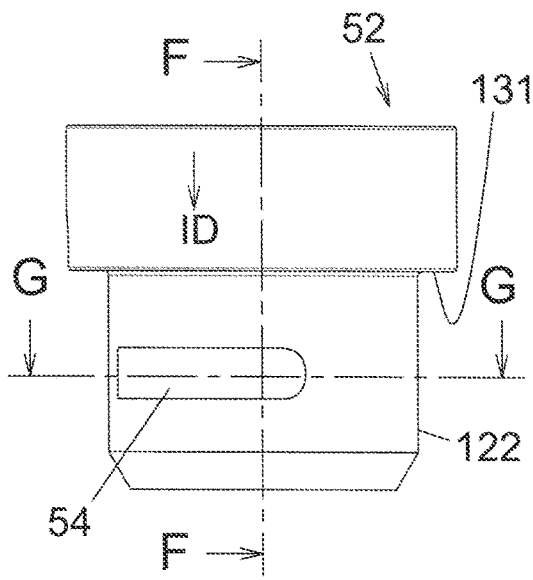
FIG. 13 shows a side view of the connection member in FIG. 12.

FIG. 13 shows a side view of the connection member in FIG. 12 and discloses the locking groove 54 perpendicular oriented in the cylindrical surface 122 in relation to the insertion direction ID of the connection member 52. The connection member is provided with a stop shoulder 131 limiting the protrusion of the connection member 52 in its active state.

Figure 14:
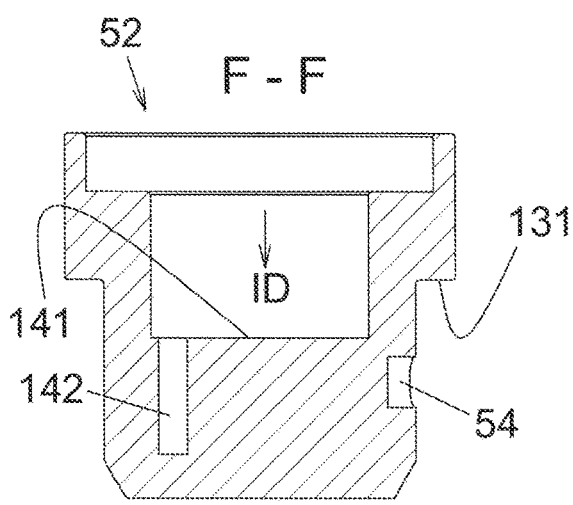
FIG. 14 shows a section view F-F as indicated in FIG. 13.

FIG. 14 shows in section F-F the connection member 52 with its locking groove 54 and its stop shoulder 131. The connection member 52 has a spring compartment 140 with a bottom 141 in which bottom 141 a spring end channel 142 is extending in a direction parallel to the insertion direction ID. The purpose of the spring end channel 142 is to anchor the first end 58 of the state spring 57 in the connection member 52, se FIG. 5. The second end 59 of the state spring 57 is anchored in the male housing top 56 so that the ends are rotationally fixed between the housing top 56 and the connection member 52 so that the spring coefficient of the state spring 57 can be increased upon rotation of the release member 55, se FIG. 5. Also the locking groove 54 is indicated in the figure.

Figure 15:
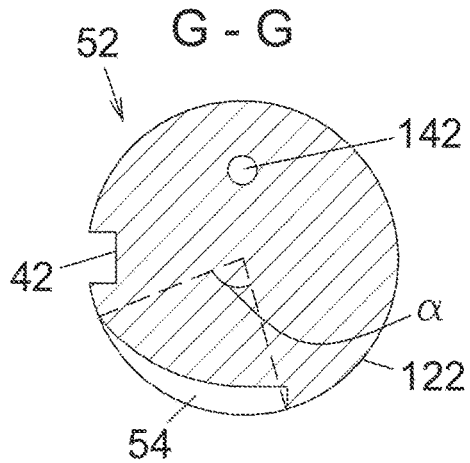
FIG. 15 shows a section view G-G as indicated in FIG. 13.

FIG. 15 shows a section view G-G as indicated in FIG. 13 in which the releasing groove 42 is provided in the cylindrical surface 122 of the connection member 52. In order for the connection member 52 to be telescopically movable in the male housing 51 the entraining pin 21 slides in this releasing groove 42. The locking groove 54 with its wedge form is also disclosed in the cylindrical surface 122 of the connection member 52. The angular peripheral enclosure a of the locking groove as disclosed is 85°-90°, however this angel might in other embodiments be in the range of $45°<\alpha<140°$. Preferably, the angular peripheral enclosure a of the locking groove is the same as the rotation angle of the release member disclosed in FIG. 11, but not necessary.

In use, when the male part 12 is in an extension active state, closed to the female part, and when the distance between the parts reaches a certain attraction range, the male part will be magnetically attracted by the female part, the locking pin 75 of female part will be snapped into the locking groove 54, and the connection has been completed by an automatically locking. In order to separate the connection members from each other the release member 55 is to be rotated which makes the locking pin 75 to move from the locking groove 54 and snap into the releasing groove 42 which is vertical arranged in the connection member 52.

Then the connection device is mechanically unlocked only held by the magnetic force and the connection parts can be separated in that the locking pin 75 can slide along the releasing groove 42.

The male part can be set into a passive state in that the connection member 52 is telescopically pressed into the male housing 51 and is held by the magnetic force in the housing in a compressed passive state in which the male part and the female part cannot connect magnetically to each other even if the parts abut each other. When a connection is to be make, the male part is to be set into an active state by turning the release member 55 which will enhance the spring coefficient, and the spring force will exceed the magnetic holding force and the connection member is popping out to an extended active state.

The structure of female part can effectively prevent the leakage of magnetic force. In the non-operating condition, the closure member 76 is pressed by the security spring 77 to close the female opening 74. By tests that have been made there is a very small amount of external magnetism identified outside the female part and therefore the connection device can be identified as a non-magnetic article. The structure of the female part helps to control the leakage of magnetic force and increase the magnetic attraction force when connecting, which is important for the whole device.

The invention claimed is:

1. A magnetic and mechanical connection device, comprising:
    a female connection surface provided female part with a female housing having a bottom and a top, a first permanent magnet is attached to an inside on the bottom, the top comprising a female opening;
    a male connection surface provided male part with a male housing having a connection member having at least a magnetic surface and being smaller than the female opening in the female part in order for the male part to be able to enter the female opening in an insertion direction and to connect magnetically with the permanent magnet;
    a spring biased locking pin attached either to the connection member of the male part and to the female opening of the female part which locking pin is directed in a perpendicular direction from the insertion direction and which locking pin is interacting in a locking engagement with an opposite locking groove in the male part which locking groove is directed half of circumferential and essentially perpendicular to the insertion direction and being wide enough to receive the spring biased locking pin; and
    a release member configured to press the locking pin out of the locking groove at a rotation of the release member in order to make it possible to separate the female connection surface from the male connection surface.

2. The device according to claim 1, wherein the locking groove is located on the connection member and that the locking pin is located in the female opening so that the locking pin engages the locking groove when the connection member enters the female opening.

3. The device according to claim 2, wherein the locking groove is located on a periphery of the connection member only along a part thereof.

4. The device according to claim 2, wherein the connection member of the male part is provided with a releasing groove on its surface, the releasing groove is oriented parallel to the insertion direction of the connection member, and the releasing groove is wide enough to receive the spring biased locking pin of the female part when the connection member with its release groove is rotated to a position directly opposite the spring biased locking pin.

5. The device according to claim 2, wherein the connection member of the male part is spring biased and movable relative to the male part housing in directions parallel to its insertion direction between an extended position and a compressed position in which compressed position the male connection surface and the magnetic surface of the connection member are aligned.

6. The device according to claim 1, wherein the locking groove is located on a periphery of the connection member only along a part thereof.

7. The device according to claim 1, wherein the connection member of the male part is provided with a releasing groove on its surface, the releasing groove is oriented parallel to the insertion direction of the connection member, and the releasing groove is wide enough to receive the spring biased locking pin of the female part when the connection member with its release groove is rotated to a position directly opposite the spring biased locking pin.

8. The device according to claim 1, wherein the connection member of the male part is spring biased and movable relative to the male part housing in directions parallel to its insertion direction between an extended position and a compressed position in which compressed position the male part connection surface and the magnetic surface of the connection member are aligned.

9. The device according to claim 1, wherein the male part is provided with the release member which is located on the outside of the male part housing for operating the connection member for releasing the connection member from its compressed position.

10. The device according to claim 9, wherein the release member is connected to the connection member of the male part for rotating the connection member when the release member is rotated relative to the male part housing.

11. The device according to claim 9, wherein the release member operates the connection member from the passive state to the active state and sets the device in a state for releasing the attached male part from the female part by a rotational movement of the release member.

12. The device according to claim 11, wherein the rotational movement of the release member takes place under an angle that is approximately 45°-140°.

13. The device according to claim 12, wherein the rotational movement of the release member takes place under an angle of 75°.

14. The device according to claim 1, wherein the connection member of the male part in a first position protrudes from the male connection surface of the male part in an active state and that the connection member is compressed towards the spring force acting upon the connection member and locked in a second position and that the magnetic surface and the male connection surface is in that locked position levelled with each other in a passive state of the device.

15. The device according to claim 1, wherein the male part housing is provided with a second permanent magnet cooperating with one of a magnetic surface and a third permanent magnet, either of which is attached to the connection member and the other is attached to a male housing top, and a state spring provided with a first end and a second end is rotationally fixed and attached between the male housing top and the connection member, the state spring compression force is lower than the magnetic force holding the connection member in its passive compressed state, the state spring compression force is increased to a level exceeding the magnetic holding level at twisting the state spring by rotating the release member.

16. The device according to claim 1, wherein a spring biased closure member is located in the female part housing and movable axially parallel with the insertion direction and which closure member closes the female opening in a passive state of the device.

17. The device according to claim 1, wherein the female opening and the connection member of the device are cylindrical, and the spring biased locking pin is directed in a radial direction.

18. The device according to claim 1, wherein the female part of the device is attached to a first object and the male part of the device is attached to a second object for engagement and disengagement of the objects.

19. The device according to claim 18, wherein the device is attached as a magnetic coupling with a mechanical safety device for connecting at least two baby strollers to each other.

20. The device according to claim 1, wherein one of the female part and the male part is provided with two opposite each other spring biased locking pins interacting with two separate locking grooves.

* * * * *